United States Patent [19]

Roden

[11] Patent Number: 4,972,661
[45] Date of Patent: Nov. 27, 1990

[54] AGRICULTURAL MOWER HAVING A DISPLACEABLE CONDITIONING ROLLER ASSEMBLY

[76] Inventor: Thomas V. Roden, 215 N. Spring Rd., Port Washington, Wis. 53074

[21] Appl. No.: 491,539

[22] Filed: Mar. 12, 1990

Related U.S. Application Data

[63] Continuation-in-part of Ser. No. 242,884, Sep. 12, 1988, Pat. No. 4,907,400.

[51] Int. Cl.$^5$ .................... A01D 43/10; A01D 82/00; A01D 75/18
[52] U.S. Cl. .......................... 56/1; 56/10.4; 56/15.8; 56/DIG. 1
[58] Field of Search .................. 56/1, 10.4, 15.8, 16.4, 56/14.9, 17.1, DIG. 10, DIG. 22, DIG. 1

[56] References Cited

U.S. PATENT DOCUMENTS

| | | | |
|---|---|---|---|
| 2,732,675 | 1/1956 | Smith et al. | 56/10.4 |
| 3,698,162 | 10/1972 | Scarnato et al. | 56/1 |
| 3,959,957 | 6/1976 | Halls | 56/15.8 |
| 4,011,709 | 3/1977 | Mott et al. | 56/10.4 |
| 4,407,110 | 10/1983 | McIlwain et al. | 56/15.8 |
| 4,472,927 | 9/1984 | Vogt et al. | 56/DIG. 1 |
| 4,565,056 | 1/1986 | Heidjann | 56/15.8 |
| 4,747,255 | 5/1988 | Roden | 56/10.4 |
| 4,843,805 | 7/1989 | Wellman | 56/1 |
| 4,907,400 | 3/1990 | Roden | 56/10.4 |

Primary Examiner—Bruce M. Kisliuk
Attorney, Agent, or Firm—Emrich & Dithmar

[57] ABSTRACT

An agricultural mower having a cutter mechanism for cutting a crop, a reel for guiding the crop into the cutter mechanism and lifting the crop after it is cut, and conditioning rollers, the machine including a pair of parallel swing arms on each side of the cutter mechanism for permitting the cutter mechanism when it strikes an obstacle to swing primarily rearwardly initially and then upwardly to a clearing height as the arms swing pendulum-like, side support arms for the reel connected to the cutter mechanism by lift links constructed and arranged to raise the reel upon initial rearward movement of the cutter mechanism so that the reel assembly will also clear the obstruction without damage, and support arms for the conditioning rollers to allow the conditioning rollers to move rearwardly initially and then upwardly upon predetermined rearward movement of the cutter mechanism.

15 Claims, 4 Drawing Sheets

AGRICULTURAL MOWER HAVING A DISPLACEABLE CONDITIONING ROLLER ASSEMBLY

RELATED APPLICATION

This application is a continuation-in-part of my copending prior application, Ser. No. 242,884, which was filed on Sept. 12, 1988 now U.S. Pat. No. 4,907,400.

BACKGROUND OF THE INVENTION

The present invention relates to an agricultural mower having a cutting mechanism such as a reciprocating cutter bar or rotary cutter for mowing a crop and guiding the crop into conditioner rolls and thence through a windrower, if desired, for placing the cut, conditioned crop in a window for later pick up by a bailing machine.

Agricultural mowers of this type are widely used for harvesting varying kinds of crop, particularly hay and forage crops such as alfalfa. The mowers may either be self-propelled or adapted to be pulled by an agricultural tractor, as is the embodiment illustrated herein.

Moreover, there are variations in the types of equipment used for mowing. For example, not all mowers condition the crop, and not all mowers form the cut crop into a window. Some mowers simply leave the crop in a swath having substantially the same width as the cut swath. Thus, the embodiment disclosed herein of the cutting and conditioning mechanism is for exemplary purposes only and is not intended to limit the scope of the invention, as persons skilled in the art will readily appreciate.

In an effort to cut as much of the crop as possible for harvesting, the cutter mechanism, whether it is a reciprocating or a rotary-type cutting mechanism, is located close to the ground. Because at the time of harvest, the crop is usually comparatively high and thick, it is difficult to see obstructions such as rocks, stumps or partially buried logs. Should the cutting mechanism strike such an obstruction, it can not only cause damage to the individual cutting blade which strikes the obstacle; but since most cutting mechanisms are driven from a common source, a bent blade can have the effect of stopping the entire cutting mechanism or damaging a blade by causing breakage.

Thus, there have been attempts to reduce damage to the cutter guards in the case of a reciprocating cutter-bar mowing mechanism, for example. There have been other attempts to reduce damage to the cutting mechanism. One such attempt is disclosed in my U.S. Pat. No. 4,747,255 for CUTTER-BAR SUPPORT, issued May 31, 1988. In that patent, there is described a suspension system for a reciprocating cutter-bar assembly which includes a parallel linkage suspension mechanism on each side of the cutter-bar assembly. The suspension mechanism includes swing arms which, in the use position, are substantially vertically oriented and interconnect the mower main frame with a movable cutter bar assembly, enabling the cutter-bar assembly, should it strike an object, to respond by moving first primarily rearwardly relative to the direction of travel of the main frame, and then, in a pendulum-type movement, to elevate the cutter-bar assembly above the obstruction to clearing height. This mechanism enables the mower to travel at normal ground speeds while permitting the cutter-bar assembly to react quickly in the event an obstacle is encountered by moving primarily rearwardly and then upwardly.

In the case where the obstruction is high enough, it can have the effect of striking the reel assembly itself, thereby possibly damaging the reel. This is so even though the cutter-bar assembly may be moved upwardly to clear the obstacle. Thus, agricultural mowers have been proposed in which the reel is raised in correspondence with movement of the cutter-bar assembly. However, with significant movement of the reel assembly relative to the conditioning rollers, the flow path from the reel to the inlet of the conditioning rollers will be interrupted, resulting in blockage within the mower.

SUMMARY OF THE INVENTION

The present invention provides an agricultural mower having a wheel-supported main frame, a cutter mechanism extending across the width of the frame for cutting a swath of crop and having first and second sides, and a conditioning roller assembly including a pair of conditioning rollers extending across the width of the frame and having first and second ends and a support means which supports the conditioning rollers on the main frame rearwardly and above the cutter mechanism. The conditioning rollers are driven in rotary motion about a horizontal axis transverse of the direction of travel of said mower. First and second suspension linkages mount respectively, the first and second sides of the cutter mechanism to the main frame for permitting the cutter mechanism to move in pendulum-type motion when striking an obstacle on the ground. The suspension linkages are generally vertical in the normal use position whereby the initial movement of the cutter mechanism is primarily rearward and thence upward when an obstacle is struck. The support means of the conditioning roller assembly include first and second support linkages for mounting the first and second ends of the conditioning rollers, respectively, with the first and second linkages being generally vertical in the normal use position and being pivoted rearwardly and upwardly, moving the conditioning rollers rearwardly and upwardly in response to movement of said cutter mechanism when an obstacle is struck.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION OF THE ILLUSTRATED EMBODIMENT

Figure 1:
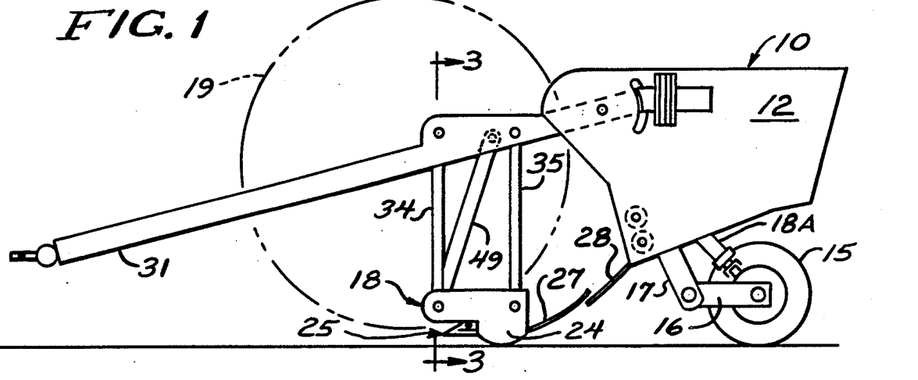
FIG. 1 is a left side view of an agricultural mower incorporating the present invention with a cutter-bar assembly and a reel in the normal use position.
Figure 2:
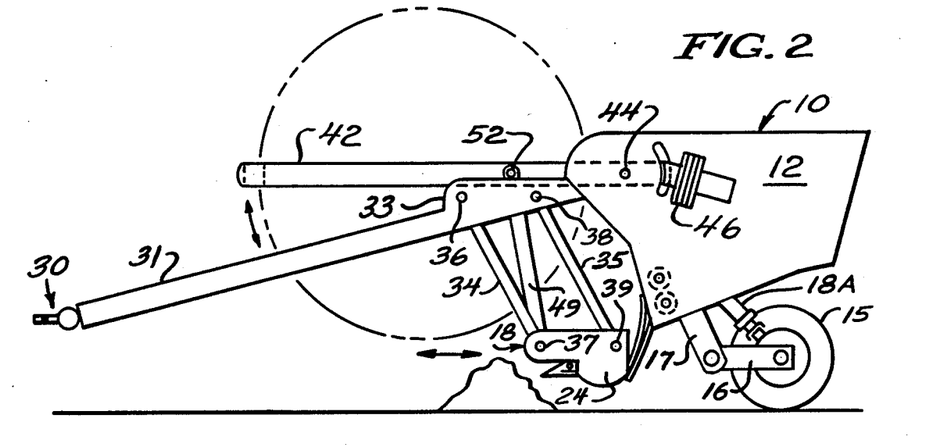
FIG. 2 is a view of the machine similar to FIG. 1 with the cutter-bar assembly and the reel raised to clear an obstacle.

Referring now to the drawings, an agricultural mower has a main frame generally designated 10 which may be conventional in the form of a main rear beam 11 extending transverse of the direction of travel and including side panels 12, 13. The main frame is supported by a pair of wheels, one of which is seen in FIGS. 1 and 2 and designated 15. The wheel 15 is connected to a wheel arm 16 which is pivotally mounted to a wheel support 17 connected, in turn, to the main frame. A hydraulic cylinder 18A is interconnected between the wheel arm 16 and the wheel support 17 to raise and lower the main frame between a transport position in which the machine is elevated and a use position in which the machine is lowered as seen in FIG. 1.

Figure 3:
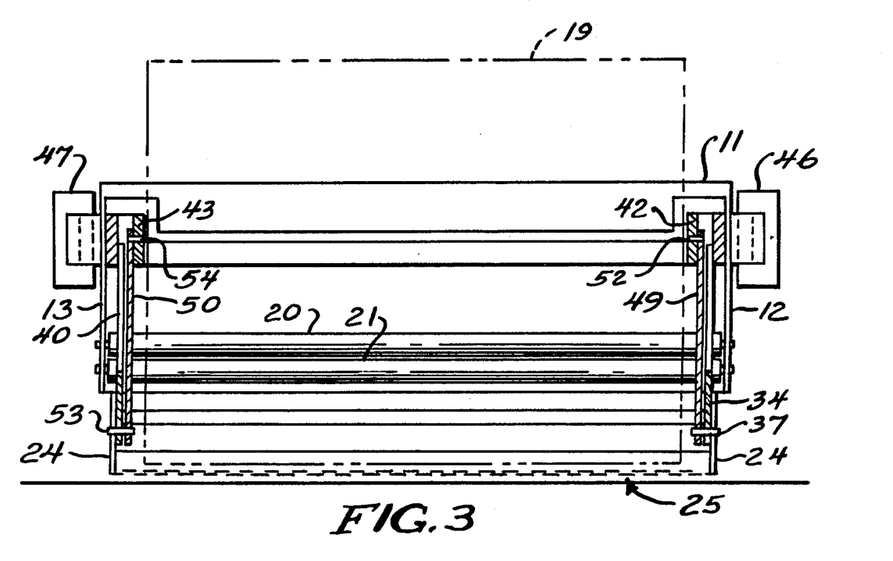
FIG. 3 is a larger, elevational view of the mower of FIG. 1 taken from the front, that is the left as viewed in FIG. 1.

Referring then to FIG. 1, the machine of the illustrated embodiment includes a cutter-bar assembly 18, a reel diagrammatically illustrated by the large circle in chain line designated 19, and a pair of conditioning rolls 20, 21 (FIG. 3).

The cutter-bar assembly includes a cutter-bar frame 24 for mounting a conventional reciprocating cutter-bar generally designated 25 and extending transversely across the width of the machine for cutting the crop. A conventional drive mechanism (not shown) drives the cutter-bar in reciprocation for cutting the crop in a scissors-like fashion. Alternatively, rotary cutters can equally well be employed.

By way of illustrating the operation, when the cutter-bar 25 cuts the crop, the reel 19 (driven in rotary motion in a counterclockwise direction as viewed in FIGS. 1 and 2), guides the crop into the cutter mechanism and then feeds it across a pair of overlapping baffles 27, 28 into the conditioning rolls which are also driven and which are spaced to crush the stem of the hay and then feed it into a windrower which deposits the crop out the rear of the machine in a narrow row on the field for drying.

The mower is drawn through the field by means of a tractor which is connected to the apparatus by means of a conventional hitch generally designated 30 and located at the forward end of a tongue or draft member 31, the rear portion of which is connected to the main frame 10 of the mower. In the illustrated embodiment, the tongue 31 is located to the left side of the machine so that the machine is designed to operate to the right of the tractor outboard of the tractor wheels. This permits the tractor to straddle a previously-formed windrow and enables the mower to operate in a swath which is not trampled by the tractor tires. Persons skilled in the art will readily appreciate that the invention could be adapted to a mower without a windrowing capacity, or to one having the tongue connected to the center of the transverse beam 11 rather than at the side as in the illustrated embodiment.

The cutter-bar assembly 18 is mounted to a forwardly extending portion 33 of the main frame 10 by means of two pairs of parallel suspension linkages. The left side parallel linkage is seen in FIGS. 1 and 2 as including a forward suspension link 34 and a rear suspension link 35. The top of the forward link 34 is pivotally connected at 36 to the main frame, and the bottom of link 34 is pivotally connected at 37 to the cutter-bar frame 24. Similarly, the top of the rear link 35 is pivotally connected at 38 to the main frame, and the bottom of link 35 is pivotally connected at 39 to the cutter-bar frame. A similar pair of parallel suspension links interconnects the right side of the main frame with the right side of the cutter-bar frame 24, one such link being designated 40 as seen in FIG. 3.

As explained in my '255 patent, the suspension links 34, 35, as well as the pair of suspension links on the far side, enable the cutter-bar frame and assembly to swing rearwardly in a pendulum-like action wherein the initial motion in a rearward direction is primarily toward the rear, whereas as the cutter-bar frame rotates more counterclockwise, the motion becomes an elevating or raising motion, as seen by comparing FIGS. 1 and 2 in the drawing. Although the suspension links illustrated are parallelogram linkages, it is not necessary that they be true parallelograms. A four-bar linkage could equally well be employed.

The reel 19 is supported by a pair of forwardly extending arms 42, 43 (FIG. 3) which are pivotally connected to the main frame, the pivotal connection for the left side arm 42 being shown at 44 in FIG. 2. The reel support arms 42, 43 extend rearwardly of their respective pivotal connections to the main frame 10, and they are provided with counter weights as at 46, 47 respectively at least partially to offset or counterbalance the weight of the cantilevered reel 19. The reel 19 thus may be raised from its use position seen in FIG. 2 to an elevated travel position if desired.

Referring to FIGS. 1 and 3, a pair of side lift links 49, 50 are connected between the cutter-bar support frame 24 and the reel support arms 42, 43, respectively. Thus, the left side lift link 49 has its bottom portion pivotally connected to the pivot 37; and its upper end pivotally connected at 52 to the reel support arm 42. In the normal use position, the upper pivot 52 is located to the rear of a vertical plane passing through the lower pivot 37. Similarly, the right side lift link 50 is pivotally connected at 53 to the cutter-bar frame, and its upper end is pivotally connected at 54 to the right side reel support arm 43. The lift links 49, 50 extend in the same general plane in the various positions of use if the reel is moved as a unit. However, an advantage of the present invention is that if one side of the cutter mechanism engages an obstacle, that side may be raised while leaving the other side in the use position, depending, of course, on the size of the obstacle.

It will be observed from FIG. 1 that in the normal use position, the reel lift links 49 and 50 extend upwardly and rearwardly from their respective pivotal connections to the cutter-bar frame 24. Thus, as the cutter-bar frame 24 moves in its initial motion rearwardly when the cutter-bar strikes an obstacle, as illustrated in FIG. 2 for example, the lift link 49 pivots counterclockwise about its upper pivot 52. However, the suspension links 34, 35 are connected to the main frame extension 33, and that frame is supported by the tractor hitch 30 and the rear wheels 15 so that it maintains a constant elevation. As the lift link 49 thus rotates counterclockwise, the reel support arms 42, 43 will be raised immediately even though the initial movement of the cutter bar frame is primarily horizontal. This is so because the horizontal distance between the two pivots 52, 37 is shorter when the cutter-bar frame 24 is in the normal use positions of FIG. 1 and that distance increases as the lower end of the lift arm 49 begins to move rearwardly beneath the upper pivot 52.

As the movement of the cutter-bar frame 24 progresses rearwardly, and the vertical motion begins to take effect, then the reel is moved at an ever increasing rate and responds to the rearward movement of the cutter-bar frame, at least until the lower pivot 37 passes beneath or "under center" relative to the upper pivot 52.

It will thus be appreciated that this arrangement not only accommodates a quick response of the cutter-bar assembly to engaging an obstacle when the machine is being pulled in a forward direction so as to displace the cutter-bar assembly from the use position (FIG. 1) to a clearing position (FIG. 2), but the side lift links 49, 50 also provide a quick vertical action responsive to the rearward motion of the cutter-bar frame to elevate the reel support arms, and thus the reel itself, from the use position (FIG. 1) to a raised or clearing position (FIG. 2).

Referring to FIGS. 4-7, there is illustrated a further embodiment for an agricultural mower which is similar to the agricultural mower illustrated in FIGS. 1-3, but has a conditioning roller assembly 60 which is mounted for movement relative to the frame in response to movement of the cutter-bar assembly 18 when an obstacle is struck by the cutter-bar assembly. The conditioning roller assembly is mounted to an upwardly extending rearward portion 58 of the main frame 10 by means of two pairs of parallel suspension linkages, including four links 61-64, shown in FIG. 7, which is an enlarged fragmentary top plan view with the reel removed, which are pivotally connected to a pair of side plates 65 and 66 which carry the conditioning rollers 20 and 21. Each of the side plates 65 and 66 is generally triangular in shape with the two conditioning rollers 20 and 21 mounted one above the other by their ends at forwardly located sides 65a and 66a of the side plates. The conditioning rollers define an inlet or bite 67 therebetween to which cut crop is directed by the reel 19 and cutting mechanism in use.

Figure 4:
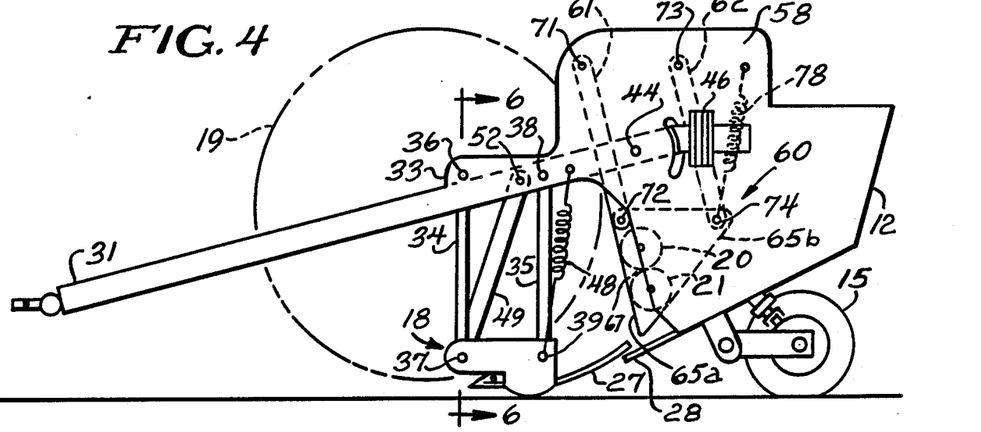
FIG. 4 is a left side view of an agricultural mower incorporating the present invention with a cutter-bar assembly, a reel, and conditioning rollers in the normal use position.
Figure 5:
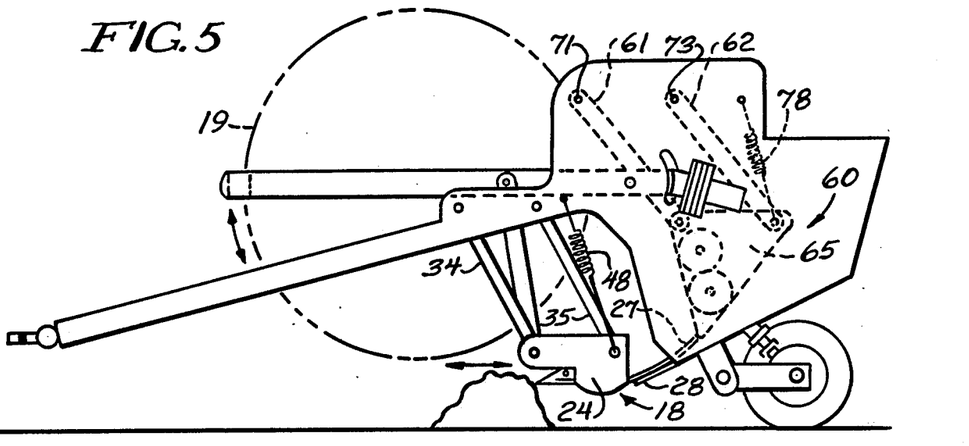
FIG. 5 is a view of the agricultural mower similar to FIG. 4 with the cutter-bar assembly and the reel raised to clear an obstacle and with the conditioning rollers raised in correspondence with the cutter-bar assembly.
Figure 6:
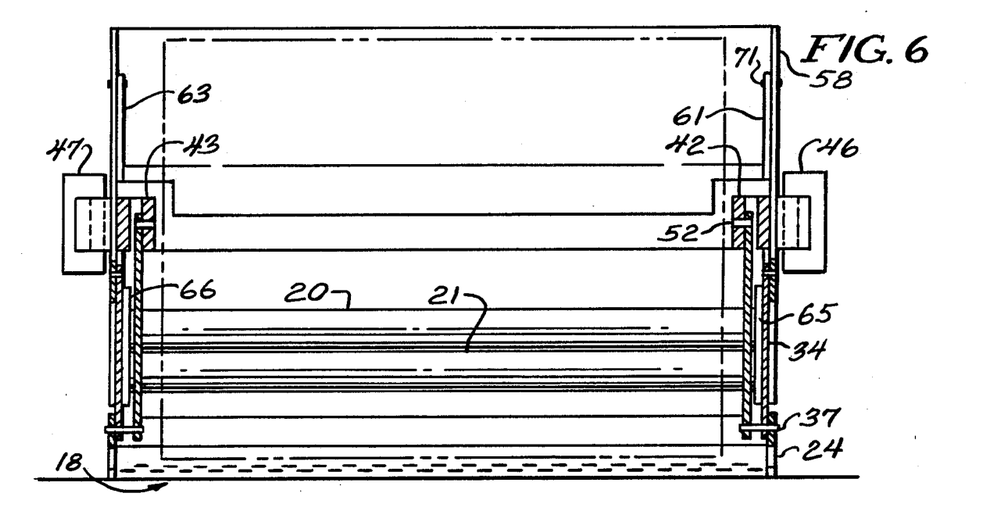
FIG. 6 is a front elevational view of the agricultural mower of FIG. 4.
Figure 7:
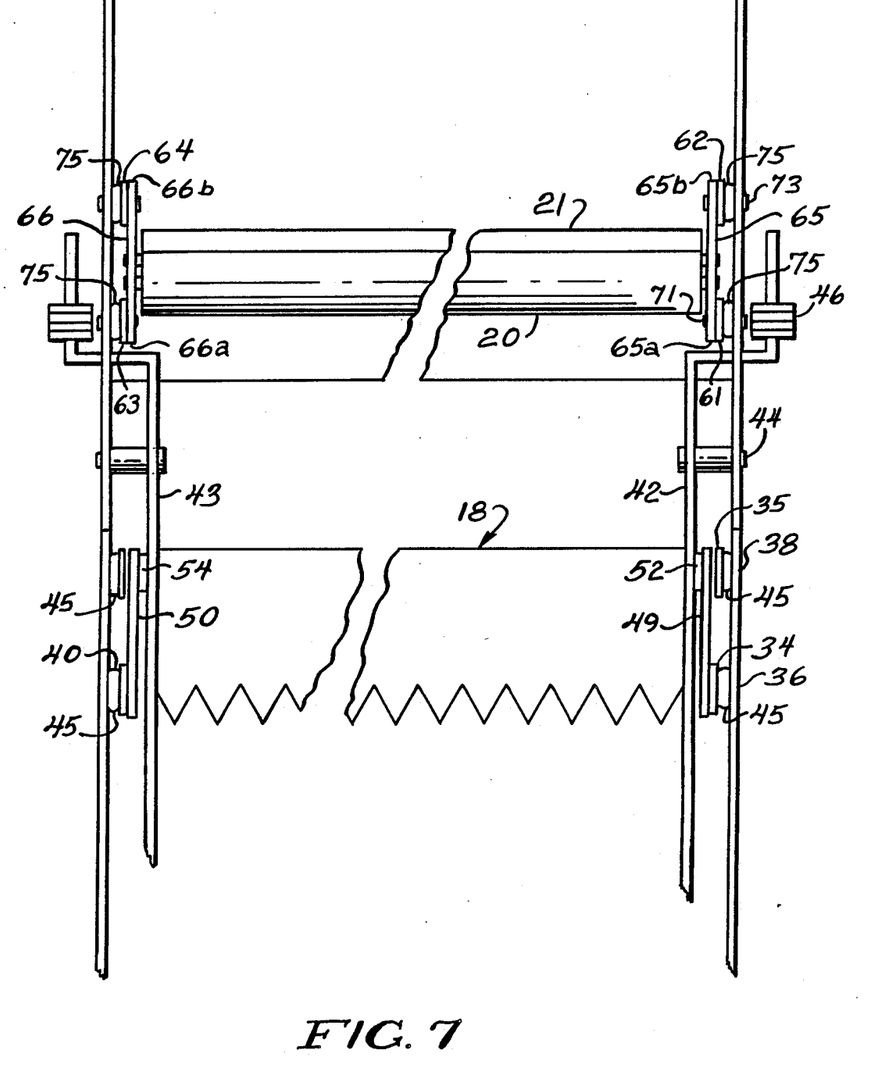
FIG. 7 is an enlarged fragmentary top plan view illustrating the mounting of the conditioning roller assembly of the agricultural mower of FIG. 4.

The left side parallel linkage is seen in FIGS. 4 and 5 as including a forward suspension link 61 and a rear suspension link 62. The top of the forward link 61 is pivotally connected at 71 to the main frame extension 58, and the bottom of link 61 is pivotally connected at 72 to the forward edge 65a of the side plate 65 of the conditioning roller assembly 60. Similarly, the top of the rear link 62 is pivotally connected at 73 to the extension 58 of the main frame, and the bottom of the link 62 is pivotally connected at 74 to the rearward portion 65b of the side plate 65 of the conditioning roller assembly 60. A similar pair of parallel suspension links, including links 63 and 64, interconnect the right side of the main frame with the right side of the conditioning roller assembly 60, links 63 and 64 being illustrated in FIG. 7, for example. A transverse member (not shown) may interconnect the two side plates 65 and 66 to form a rigid frame for the conditioning roller assembly.

The pivot connections 71 and 73 between links 61 and 62 and the frame side plate 12 and the pivot connections 72 and 74 between links 61 and 62 and the side plate 65 include ball joints 75 to provide a flexible connection for the suspension links between the frame and the side plate 65 of the conditioning roller assembly. A similar arrangement is provided for pivotally connecting the far side links 63 and 64 between the frame side panel 13 and the conditioning roller side plate 66. One of the suspension ball joints for the conditioning roller assembly, preferably one that is attached to the frame, serves as an axle to prevent wandering of the conditioning roller assembly.

The cutter mechanism includes a similar pivotal ball joint suspension arrangement. The pivot connections 36 and 38 between links 34 and 35 and the frame side panel 12 and the pivot connections 37 and 39 between links 34 and 35 and cutter-bar frame 24 include ball joints 45 to provide a flexible connection for the suspension links between the frame and the cutter-bar frame 24. The far side suspension for the cutter mechanism also includes ball joint connections for the links between the frame side panel 13 and cutter-bar frame 24. One of the suspension ball joints for the cutter mechanism, preferably one that is attached to the frame, serves as an axle to prevent wandering of the cutter mechanism.

The suspension links 61-64 enable the conditioning roller assembly 60 to swing rearwardly in a pendulum-like action in response to and in correspondence with like movement of the cutter-bar assembly, wherein the initial motion in a rearward direction is primarily toward the rear. As the conditioning roller assembly rotates more counterclockwise, the motion becomes an elevated or raising motion. Although the suspension links 61-64 illustrated are parallelogram linkages, it is not necessary that they be true parallelograms. A four-bar linkage could be employed with the forward pair of link members extending at an angle relative to the rearward pair of link members.

The conditioning rollers 20 and 21 may be driven by a hydraulic motor, or other suitable manner as is known in the art, the rollers 20 and 21 being driven in opposite directions with the upper roller 20 being driven counterclockwise and the lower roller 21 being driven clockwise to draw cut crop between the conditioning rollers as is known.

An important advantage of the agricultural mower provided in accordance with the principles of the present invention, is that feed flow is maintained through the conditioning rollers to avoid blockage because the conditioning rollers are moved in correspondence with the cutter mechanism. To this end, the conditioning roller assembly 60 is mounted for movement relative to the frame in response to movement of the cutter-bar assembly 18 when an obstacle is struck. The cutter-bar assembly 18 is coupled or linked to the movable conditioning roller assembly 60 in such a way as to delay displacement movement of the conditioning roller assembly 60 until such time as the cutter-bar assembly 18 has moved a predetermined amount. By way of example, the conditioning roller assembly 60 is moved in response to the engagement of one of the baffle member 27 engaging the conditioning roller assembly frame. Thus, the cutter-bar assembly 24 must move an amount for the baffle member 27 to overlap baffle member 28 before the baffle member 27 engages the conditioning roller assembly. At such point, continued rearward movement of the cutter-bar assembly 18 will result in rearward movement of the conditioning roller assembly 60 whereby the conditioning roller assembly will move in correspondence with the cutter-bar assembly.

It will be observed from FIG. 4, in the normal use position, the links 61, 62 extend parallel to one another and downwardly and slightly rearwardly. The conditioning rollers 20 and 21 may be maintained in this normal use position by gravity. A suitable bias means, such as spring 78 is mounted between the frame and one of the lower pivot connections, such as pivot connection 74 of the conditioning roller assembly frame. A corresponding spring (not shown) is provided on the far side conditioning roller assembly suspension. The springs decrease the reaction weight of the conditioning roller assembly, enabling the conditioning roller assembly to respond more quickly to variations in ground contour with less force on the assembly. A spring 48 is connected between the side panel 12 of the frame and cutter-bar frame 24 at pivot connection 39. A corresponding spring (not shown) is provided on the far side cutter-bar assembly suspension. The springs decrease reaction weight of the cutter, enabling the cutter mechanism to respond more quickly to variations in ground contour with less force on the cutter-bar and guards. Counterweights can be used in the manner of counterweights 46 and 47 for the reel assembly, for counterbalancing the weight of the conditioning roller assembly. Because the weight of the conditioning roller assembly 60 is greater than that of the cutter-bar assembly, the conditioning roller assembly will be slower to move. Thus, a spring or counterweight providing a smaller counter force can be used for the conditioning roller assembly than that required for the cutter-bar assembly.

In the agricultural mower illustrated in FIGS. 4-7, when the cutting bar assembly 18 engages an obstacle on the ground, the cutter-bar assembly 18 will move rearwardly and upwardly, driving the reel 19 and the cutter blades to a clearance position as described above with reference to FIGS. 1-3. If rearward movement of the cutter bar assembly is to the extent that the baffle member 27 completely overlaps baffle member 28 as illustrated in FIG. 5, the baffle member 27 will engage the conditioning roller assembly 60 and with continued rearward movement of the cutter-bar assembly, the conditioning roller assembly will be driven rearwardly, thereby maintaining its alignment with the reel 19 so that harvested crop will be directed to the inlet 67 to the conditioning roller assembly defined by the adjacent surfaces of the two conditioning rollers 20 and 21. When the cutter-bar bar assembly 24 clears the obstacle, the cutter-bar assembly 18 will pivot forward, permitting the conditioning roller assembly 60 to return to its normal use position under the force of gravity.

Movement of the conditioning roller assembly in correspondence with the cutter-bar assembly and reel 19 is highly desirable, particularly for agricultural mower units of larger widths in the range of nine to sixteen feet, for example. For agricultural mowers of such size, pivoting of the cutter-bar assembly and reel 19 would otherwise result in misalignment of the inlet of the conditioning rollers 20 and 21, interrupting the flow path for harvested crop.

Figure 8:
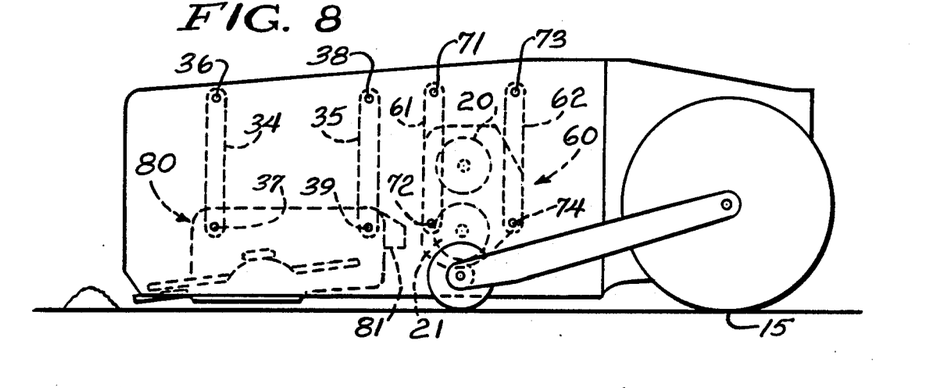
FIG. 8 is a left side view of an agricultural mower incorporating the present invention with a rotary cutter and conditioning rollers in the normal use position.
Figure 9:
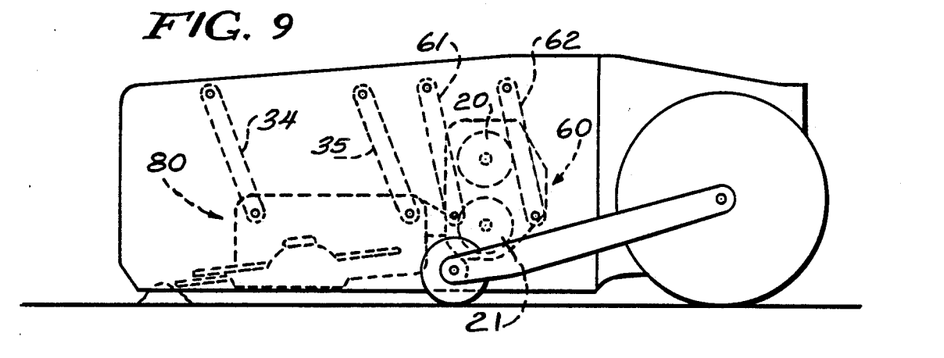
FIG. 9 is a view of the agricultural mower of FIG. 8 with the rotary cutter to clear an obstacle and with the conditioning rollers raised in correspondence with the rotary cutter.

Referring to FIGS. 8 and 9, the moveable conditioning roller assembly 60 may be employed in an agricultural mower of the type employing a rotary cutter mechanism 80, and one which does not employ a reel, such as reel 19 for the embodiment illustrated in FIGS. 4-7. In rotary cutter units, the rotary cutter directs the cut crop to the conditioning rollers as is known. The operation for the mower illustrated in FIGS. 8 and 9, when the cutter mechanism strikes an object and moves rearwardly, moving the conditioning rollers, is similar to that described for the embodiment illustrated in FIGS. 4-7. As for the embodiment just described, the cutter mechanism must move rearwardly at least a predetermined amount before the conditioning rollers are moved. FIG. 8 illustrates the agricultural mower with its cutter mechanism 80 and conditioning roller assembly 60 in the normal use position. In FIG. 9, the rotary cutter mechanism 80 is illustrated as engaging an obstacle on the ground, pivoting the cutter mechanism 80 rearwardly and upwardly, moving rearwardly projecting portion 81 of the cutter mechanism into engagement with the conditioning roller assembly 60. With continued rearward movement, the conditioning roller assembly is moved first rearwardly and then upwardly in correspondence with movement of the cutter mechanism. In this way, the conditioning rollers are maintained aligned with the rotary cutter mechanism so that the flow path for cut crop is not interrupted when the cutter mechanism moves rearwardly at least a predetermined minimum amount in response to striking an object.

As mentioned, the illustrated embodiments are directed to an agricultural mower having a reciprocating or rotary cutter, a reel, side pivot draft member, and windrowing capacity. The invention may be used with any one or more of these conventional features, or without any of them. Other modifications, deletions or additions are also possible.

Having thus disclosed in detail embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In an agricultural mower having a wheel-supported main frame; a cutter mechanism extending across the width of the frame for cutting a swath of crop and having first and second sides; a conditioning roller assembly including a pair of conditioning rollers extending across the width of the frame and having first and second ends, said conditioning rollers driven in rotary motion about a horizontal axis transverse of the direction of travel of said mower, and support means supporting said conditioning rollers on said main frame rearwardly and above said cutter mechanism; the improvement comprising: first and second suspension linkages mounting, respectively, said first and second sides of said cutter mechanism to said main frame for permitting said cutter mechanism to move in pendulum-type motion when striking an obstacle on the ground, said suspension linkages being generally vertical in the normal use position whereby the initial movement of said cutter mechanism is primarily rearward and thence upward when an obstacle is struck; and third and fourth suspension linkages mounting said first and second ends of said conditioning rollers, respectively, with said third and fourth linkages being generally vertical in the normal use position and being pivotable rearwardly and upwardly, carrying the conditioning rollers rearwardly and upwardly in response to movement of said cutter mechanism when an obstacle is struck.

2. The agricultural mower of claim 1 wherein said third and fourth suspension linkages each comprises first and second elongated links each link being pivotally connected at its lower end to one of said first and second ends of said conditioning rollers and pivotally connected at its upper end to said main frame.

3. The agricultural mower of claim 2, wherein said conditioning roller assembly includes a first side plate supporting said first ends of said conditioning rollers and a second side plate supporting said second ends of said conditioning rollers, said lower ends of said links being pivotally connected to said side plates.

4. The agricultural mower of claim 3, wherein said cutter mechanism includes an engagement portion extending rearwardly thereof and movable into engagement with said conditioning roller assembly upon rearward movement of said cutter mechanism to a first position, whereby said conditioning roller assembly is driven rearwardly by said cutter mechanism with continued movement of said cutter mechanism past said first position.

5. The agricultural mower of claim 1, characterized in that said suspension linkages on each side of said mower cooperate with one another to raise their associated ends of said cutter mechanism and conditioning rollers in unison and independently of the corresponding suspension linkages on the other side of said mower.

6. The agricultural mower of claim 5, wherein said mower is characterized as an agricultural crop mower adapted to be pulled by a tractor and further includes a draft member connected to said main frame and including a hitch means for connection said draft member to a tractor.

7. In an agricultural mower having a wheel-supported main frame; a cutter mechanism extending across the width of the frame for cutting a swath of crop and having first and second sides; a reel driven in rotary motion about a horizontal axis transverse of the direction of travel of said mower and first and second support arm means supporting said reel in cantilever in front of said main frame and above said cutter mechanism, and a conditioning roller assembly including a pair of conditioning rollers extending across the width of the frame and having first and second ends and support means supporting said conditioning rollers on said frame rearwardly and above said cutter mechanism; the improvement comprising: first and second suspension linkages mounting, respectively, said first and second sides of said cutter mechanism to said main frame for permitting said cutter mechanism to move in pendulum-type motion when striking an obstacle on the ground, said suspension linkages being generally vertical in the normal use position whereby the initial movement of said cutter mechanism is primarily rearward and thence upward when an obstacle is struck; first and second lift linkage means interconnecting said first and second ends of said cutter mechanism respectively with said first and second reel support arms, said suspension linkages, lift linkage means and reel support arms being constructed and arranged to raise said reel when said cutter mechanism engages an obstacle, and third and fourth suspension linkages mounting said first and second ends of said conditioning rollers, respectively, with said third and fourth linkages being generally vertical in the normal use position and being pivotable rearwardly and upwardly, carrying the conditioning rollers rearwardly and upwardly in response to movement of said cutter mechanism when an obstacle is struck.

8. The agricultural mower of claim 7 wherein said third and fourth suspensioon linkages each comprises first and second elongated links each link being pivotally connected at its lower end to one of said first and second ends of said conditioning rollers and pivotally connected at its upper end to said main frame.

9. The agricultural mower of claim 8, wherein said conditioning roller assembly includes a first side plate supporting said first ends of said conditioning rollers and a second side plate supporting said second ends of said conditioning rollers, said lower ends of said links being pivotally connected to said side plates.

10. The agricultural mower of claim 9, wherein said cutter mechanism includes an engagement portion extending rearwardly thereof and movable into engagement with said conditioning roller assembly upon rearward movement of said cutter mechanism to a first position, whereby said conditioning roller assembly is driven rearwardly by said cutter mechanism with continued movement of said cutter mechanism past said first position.

11. The agricultural mower of claim 10, characterized in that said suspension linkages on each side of said mower cooperate with one another to raise their associated ends of said cutter mechanism and conditioning rollers in unison and independently of the corresponding suspension linkages on the other side of said mower.

12. In an agricultural mower having a wheel-supported main frame; a cutter mechanism extending across the width of the frame for cutting a swath of crop, a conditioning roller assembly including a pair of conditioning rollers, a reel driven in rotary motion about a horizontal axis transverse of the direction of travel of said mower for guiding the crop into the cutter mechanism and moving it into the conditioning rollers, and support means constructed and arranged for supporting the cutter mechanism and the reel on the frame for permitting the cutter mechanism and the reel to move rearwardly and upwardly in response to the cutter mechanism striking an obstacle on the ground, the improvement comprising: first and second linkages supporting the conditioning roller assembly on first and second sides, respectively, whereby when the cutter mechanism strikes an obstacle and moves rearwardly, it engages the conditioning roller assembly moving the conditioning roller assembly in pendulum-type motion rearwardly from its normal use position.

13. The apparatus of claim 12, wherein said first and second linkages each comprises first and second elongated link members each pivotally connected at its lower end to one of said ends of said cutter mechanism and pivotally connected at its upper end to said main frame.

14. The agricultural mower of claim 13, wherein said conditioning roller assembly includes a first side plate supporting said first ends of said conditioning rollers and a second side plate supporting said second ends of said conditioning rollers, said first ends of said link members being pivotally connected to said side plates.

15. The agricultural mower of claim 14, wherein said cutter mechanism includes an engagement portion extending rearwardly thereof and movable into engagement with said conditioning roller assembly upon rearward movement of said cutter mechanism to a first position, whereby said conditioning roller assembly is driven rearwardly by said cutter mechanism with continued movement of said cutter mechanism past said first position.

* * * * *

UNITED STATES PATENT AND TRADEMARK OFFICE
CERTIFICATE OF CORRECTION

PATENT NO. : 4,972,661
DATED : November 27, 1990
INVENTOR(S) : Thomas V. Roden

It is certified that error appears in the above-identified patent and that said Letters Patent is hereby corrected as shown below:

<u>IN THE CLAIMS</u>

Col. 9, line 32 (claim 6), change "connection" to --connecting--.

Col. 10, line 2, (claim 8) change "suspensioon" to --suspension--.

Col. 10, line 44, (claim 12) insert a comma before "moving"; and

Col. 10, line 46, (claim 12) after "rearwardly" insert --and upwardly--.

Signed and Sealed this

Twenty-fourth Day of December, 1991

Attest:

HARRY F. MANBECK, JR.

*Attesting Officer*     *Commissioner of Patents and Trademarks*